INVENTORS
GEORGE STRAM
ALEXANDER A. McINTYRE
JOE E. THOMAS

INVENTORS
GEORGE STRAM
ALEXANDER A. McINTYRE
JOE E. THOMAS

BY Otto Moeller

FIG. 8

NOTE
LINE INDICATES
VALVE OPEN

INVENTORS
GEORGE STRAM
ALEXANDER A. McINTYRE
JOE E. THOMAS

FIG. 9

United States Patent Office 3,015,395
Patented Jan. 2, 1962

3,015,395
APPARATUS FOR FILTRATION
George Stram, Hellam, Alexander A. McIntyre, Lancaster, and Joe E. Thomas, York, Pa., assignors to Capitol Products Corporation, a corporation of Pennsylvania
Filed Dec. 16, 1958, Ser. No. 780,760
4 Claims. (Cl. 210—138)

This invention relates generally to improvements in filtering out solid particles from liquids, such as industrial waste liquids.

It is customary to force the liquid, or slurry as it will be hereinafter referred to, irrespective of the concentration of solids, under pressure through a filter medium, whereupon the solids build up on the filter medium in the form of a cake. As the cake builds up, a point is reached where the efficiency of the filter medium drops off sharply or may become clogged. It has been previously suggested, that as the need arises, the filter cloth or medium be cleaned by backwashing the filter medium. In other words the flow of slurry is interrupted and the flow of filtrate is reversed to pass through the filter medium and remove the deposited cake from the filter medium, and flush it from the chamber to which slurry was previously being delivered. Thus, where the filtrate is to be used for some subsequent purpose, the amount of such filtrate employed in the backwashing constitutes a definite loss, particularly if the solid particles filtered out are of a nature that tend to rapidly blind the filter cloth, thereby necessitating backwashing at frequent intervals. On the other hand, where it is desired to recover the cake resulting from the backwashing in a subsequent operation, the use of the filtrate for backwashing, results in a diluted slurry from which the previously separated filtrate must again be separated from the solid particles or cake desired to be recovered.

In accordance with this invention, the filtration is carried out in repetitive cycles, each cycle including a filtering phase and a cake discharge phase. Liquid or slurry to be filtered is forced through a filter medium under pressure, the filtrate being drained from the outlet side of the filter medium. At the desired end of the filtering phase of the cycle, which is preferably that point in the cycle at which accumulation of cake on the filter medium decreases the rate of filtration to an extent rendering further filtration inefficient, the slurry pressure is relieved by permitting it to drain freely while still being delivered to the intake side of the filter medium, whereupon further filtration ceases.

At the same time that the slurry pressure is relieved, air under pressure or purge air is delivered to the filtrate side of the filter medium, the inception of these two occurrences marking the end of the filtering phase and the beginning of the cake discharge phase. At the same time, or preferably a short time thereafter, the filtrate drain is closed to permit build up of air pressure on the filtrate side of the filter medium, which loosens and dislodges the cake on the intake side of the filter medium, whereupon it is dispersed into the flowing stream of slurry and discharged therewith through the slurry drain. The short delay in closing the filtrate drain after the purging air comes on, insures draining of filtrate from the filtrate side of the filter medium so as to eliminate any filtrate loss as backflow through the filter medium. The cycle is then ready to be repeated.

It is consequently a further object of our invention to provide a system of filtration, as above described, wherein the flow of slurry is continuous throughout the filtering and cake discharge phases of repetitive cycles of operation. A related object is to provide a system of filtration as above described wherein the deposited cake is loosened from the filter cloth and is commingled with the slurry and discharged by being drained from the intake side of the filter cloth by the continuous flow of slurry.

It is another object of the invention to provide means for rendering the system continuous and automatic through repetitive cycles.

Another object is to provide a novel and improved pressure filtering apparatus, comprising a plurality of face to face hollow frames between a pair of end plates forming, when assembled, a filter compartment, and having between adjacent frames a filter medium to divide the filter compartment into alternate slurry and filtrate chambers.

Another object is to provide an apparatus as above described wherein the hollow frames are of novel construction, being formed with a series of passages arranged, when the frames are assembled, to form manifolds, certain of which communicate with the slurry chambers and certain of which communicate with the filtrate chambers.

Another object is to provide an apparatus as above described that is easily assembled, economical to manufacture and maintain, and that provides a maximum filtering surface in proportion to the space occupied.

Other objects and advantages of the invention will become apparent from the following description which, considered in connection with the accompanying drawings, sets forth the preferred embodiment of the invention.

Figure 2:
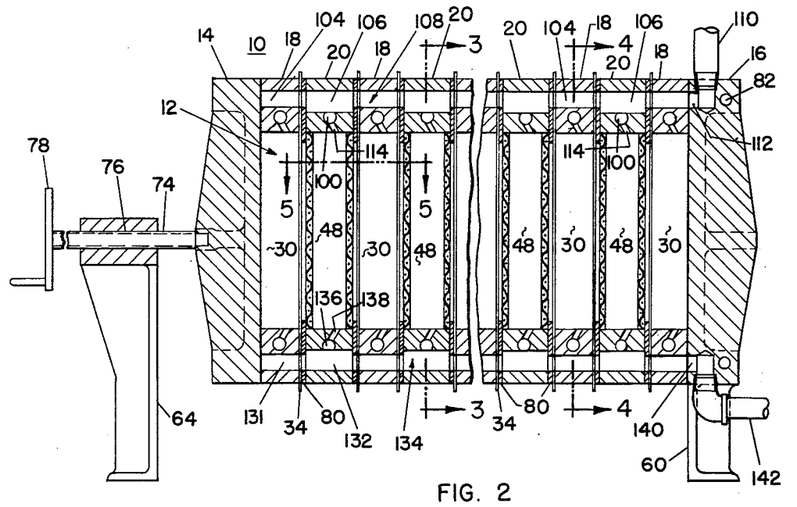
FIGURE 2 is a longitudinal vertical central sectional view through the filter.

In carrying out our invention, as illustrated in the drawings, we provide a horizontal filter receptacle 10 which is comprised of a number of assembled elements defining when assembled a filter compartment 12. These elements include a front end closure 14, a rear end closure 16 and two series of alternate substantially rectangular vertical frames 18 and 20 therebetween as best shown in FIGURE 2. The frames 18 are all identical in construction, and the frames 20 are all identical in construction though somewhat different than the frames 18. For reasons which will become obvious in the course of the description of the invention, the frames 18 will hereinafter be referred to as slurry frames and the frames 20 will be referred to as filtrate frames.

Figure 4:
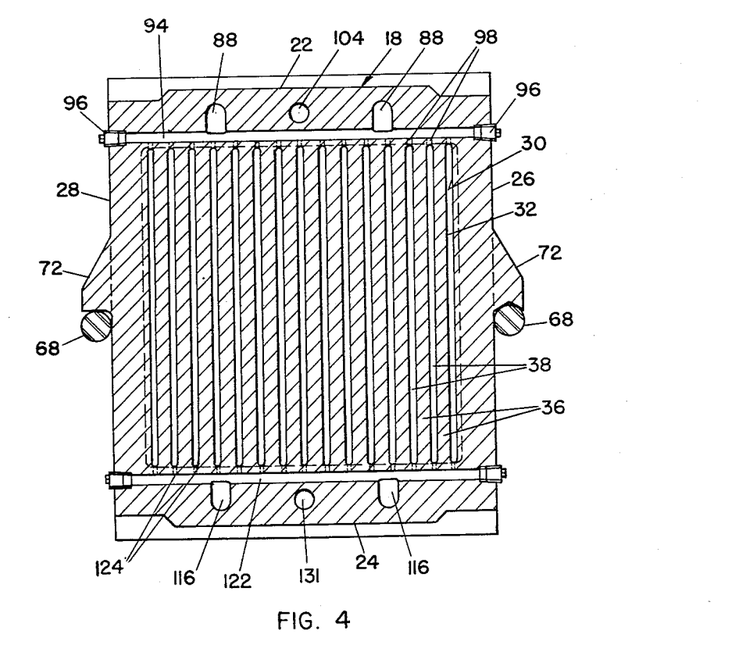
FIGURE 4 is a sectional view taken on line 4—4 of FIGURE 2.
Figure 5:
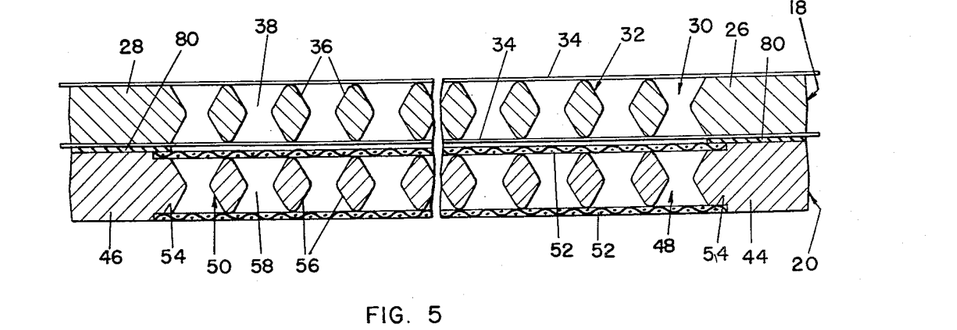
FIGURE 5 is a fragmentary sectional view taken on line 5—5 of FIGURE 2.

Each of the slurry frames 18 includes a top frame member 22, a bottom frame member 24 and side frame members 26 and 28, as best shown in FIGURE 4. The frame members 22, 24, 26, and 28 define in each of the slurry frames 18 a space which will hereinafter be referred to as the slurry chambers 30 of the slurry frames 18, since the slurry or liquid to be filtered is introduced into these chambers. The slurry chambers 30 are provided with any suitable form of grid 32 which functions as a separating support for the filter cloths 34 as will become apparent in the further course of this description. In the present instance the 32 is illustrated as being constituted by a plurality of bars 36, diamond shaped in cross section as best seen in FIGURE 5. The bars 36 are disposed in spaced parallel relationship between and parallel to the side frame members 26 and 28, and are integrally formed with and extend from the top frame member 22 to the bottom frame member 24. The bars 36 thus, in effect, divide the slurry chamber 30 of each of the slurry frames 18 into a plurality of channels 38.

Figure 3:
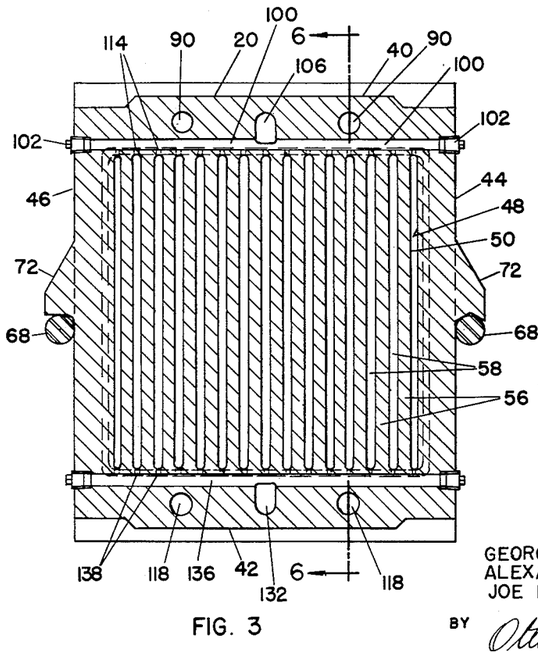
FIGURE 3 is a sectional view taken on line 3—3 of FIGURE 2.

Each of the filtrate frames 20 includes a top frame member 40, a bottom frame member 42, and side frame members 44 and 46, as best shown in FIGURE 3. The frame members 40, 42, 44 and 46 define in each of the filtrate frames 20 a space which will hereinafter be referred to as the filtrate chambers 48 of the filtrate frames 20, since the filtrate or filtered liquid passes through the filter cloths 34 into these chambers.

As in the case of the slurry chambers 30, the filtrate chambers 48 are provided with any suitable form of grid 50 which serves as a support for a wire mesh screen 52 which, in turn, functions as a separating support for the filter cloths 34. The perimetral edge of the screen 52 fits into a rabbetted recess 54 in the inner marginal edge of the frame 20. As in the case of the grids 32 of the frames 18, the grids 50 of the frames 20 are in the form of diamond shaped bars 56, dividing the filtrate chambers 48 of each of the filtrate frames 20 into a plurality of channels 58.

The filter receptacle 10 may be supported at a convenient height above the floor in any suitable manner. As shown, referring particularly to FIGURES 1, 2, 6 and 7, the rear end closure 16 is provided with depending legs 60, preferably formed integral therewith, the legs 60 being suitably secured to the floor. Projecting outwardly from the opposite sides of the rear end closure 16 between the upper and lower ends thereof, are lugs 62. Spaced forward of the rear end closure 16 is a support base 64, which is also suitably secured to the floor, and is provided at opposite sides with lugs 66 in longitudinal alinement with the lugs 62. Longitudinally extending support rods 68 extend through the pairs of alined lugs 62 and 66, and on their projecting ends are threaded the nuts 70 for preventing longitudinal movement of the support rods 68. Projecting outwardly from the sides of the frames 18 and 20 and from the sides of the front end closure 14, at or above their center of gravity are ears 72 which are adapted to rest on the rods 68 for supporting the frames 18 and 20 and front end closure 14 in vertical position.

Figure 1:
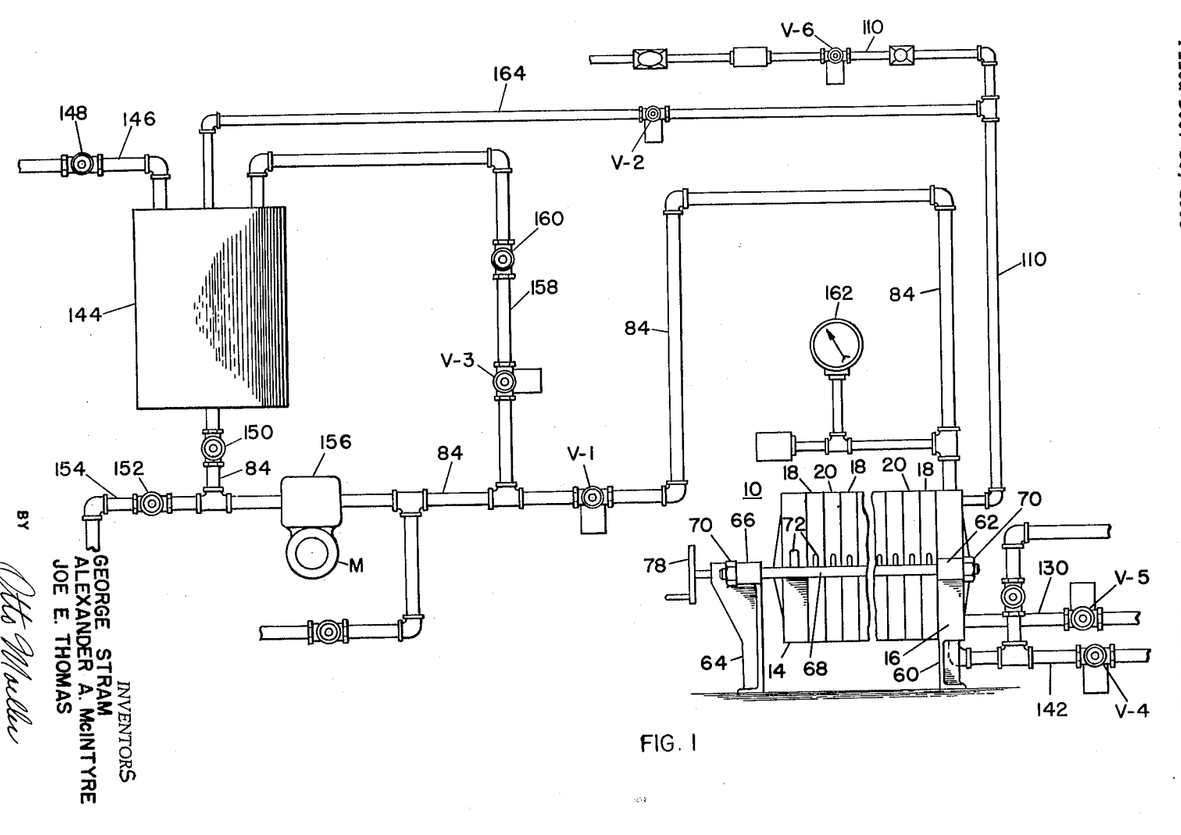
FIGURE 1 is a schematic side elevation of the filter, the piping to the filter and the valves associated with the piping, for carrying out the invention.
Figure 6:
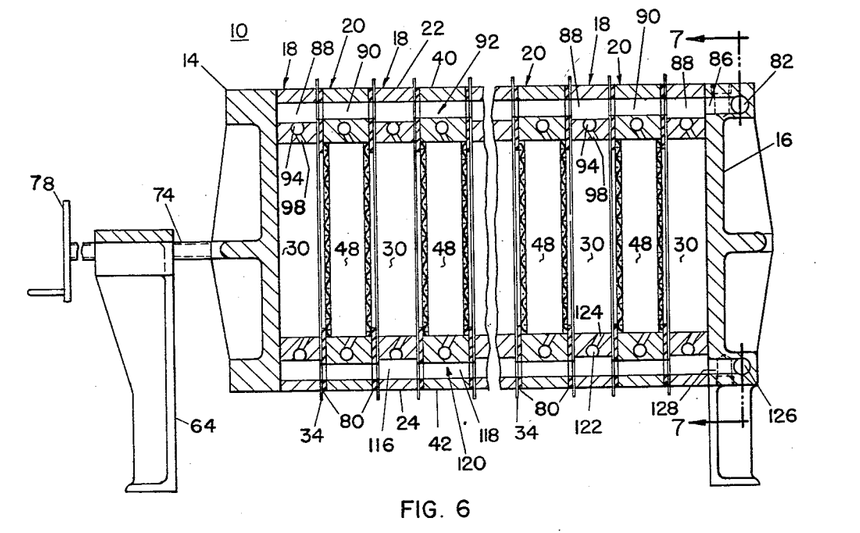
FIGURE 6 is a sectional view taken on line 6—6 of FIGURE 3.

The arrangement and construction of the elements forming the filter receptacle 10 and the supporting means is such, as may readily be seen from FIGURES 1, 2 and 6, as to permit the frames 18 and 20, and the front end closure 14, to be moved along the rods 68 in separated relation to open the filter receptacle 10 when desired. Means is provided for clamping the elements of the filter receptacle 10 in sealed engagement when filtering operations are to be carried out. This means may be of any suitable form and, as shown, includes a longitudinally extending threaded spindle 74 extending through and being in threaded engagement with a longitudinally extending threaded bore 76 in the support base 64. The outer end of the spindle 74 carries a hand wheel 78 while the inner end is arranged to contact the front end closure 14. Thus, by turning the hand wheel 78 in one direction, the spindle 74 will force the front end closure 14 to the right, as viewed in FIGURE 2, toward the stationary rear end closure 16, thereby tightly clamping the end closures and frames together. By turning the hand wheel 78 in the opposite direction, the spindle 74 moves away from the front end closure 14, so that the end closures and frames may be manually separated.

Between the adjacent faces of each pair of frames 18 and 20 is a filter cloth 34, previously referred to, which extends across the openings defined by the frames to separate the chambers 30 and 48. In order to effect a tight seal between the adjacent faces of the frames 18 and 20, there is interposed a suitable gasket 80.

Figure 7:
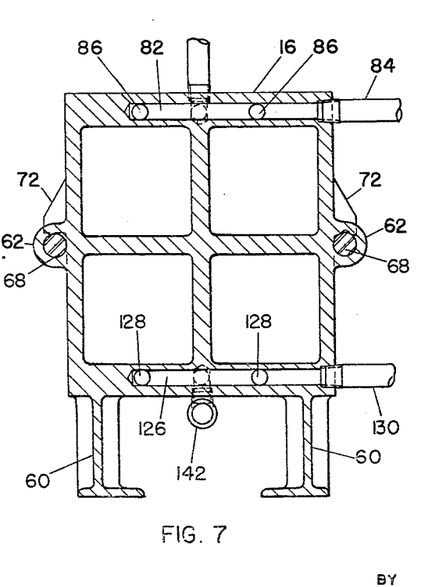
FIGURE 7 is a sectional view taken on line 7—7 of FIGURE 6.

As previously stated slurry to be filtered is introduced into the slurry chambers 30 of the slurry frames 18, and the details of construction of the elements of the filter receptacle 10 for accomplishing this will now be described. Referring particularly to FIGURES 6 and 7, the upper portion of the end closure 16 is provided with a horizontal transversely extending passage 82 opening through a lateral side of the end closure 16 where it communicates with a slurry feed line 84. A pair of laterally spaced longitudinally extending passages 86 communicate with the passage 82 and open through the front face of the end closure 16.

The top frame member 22 of each of the slurry frames 18 is provided with a pair of laterally spaced passages 88 extending longitudinally therethrough, and the top frame member 40 of each of the filtrate frames 20 is provided with a pair of laterally spaced passages 90 extending longitudinally therethrough. The passages 88 and 90 are in axial alinement with each other and with the passages 86 of the end closure 16, whereby the alined passages 88 and 90 form a pair of laterally spaced, longitudinally extending manifolds 92 for receiving the slurry from the slurry feed line 84. The filter cloths 34 and gaskets 80 are provided with cut out openings at the communicating ends of the passages 88 and 90 to permit free flow of slurry throughout the slurry manifolds 92.

Extending laterally through each of the top frame members 22 of the slurry frames 18, as best shown in FIGURES 4 and 6, is a passage 94, the ends of which are closed by suitable plugs 96. The vertical extent of the passages 88 is such as to provide communication with the passages 94 whereby the slurry flows into passages 94. Ports 98 provide communication between the passage 94 of each of the slurry frames 18 and each of the channels 38 of the slurry chambers 30, whereby the slurry to be filtered is delivered to the slurry chambers 30.

Referring to FIGURES 2 and 3, the top frame member 40 of each of the filtrate frames 20 is provided with a laterally extending passage 100 similar to the passages 94 of the slurry frames 18, above described, the ends of the passages 100 being closed by suitable plugs 102. These passages 100 do not communicate with the passages 90 which, as above described, form part of the slurry manifolds 92, and their purpose will be hereinafter described. The top frame member 22 of each of the slurry frames 18 is provided with a passage 104 extending longitudinally therethrough and disposed between the previously described passages 88, as shown in FIGURE 4. Similarly, the top frame member 40 of each of the filtrate frames 20 is provided with a passage 106 extending longitudinally therethrough and disposed between the previously described passages 90, as shown in FIGURE 3.

The passages 104 and 106 are in communicating axial alinement, as shown in FIGURE 2, and form a manifold 108 which communicates with an air supply pipe 110 through a passage 112 in the end closure 16. The air supply pipe 110 is connected with a suitable source of air under pressure. The filter cloths 34 and gaskets 80 are provided with cut out openings at the communicating ends of the passages 104 and 106 to permit free flow of air under pressure throughout the air manifold 108. The vertical extent of the passages 106 is such as to provide communication with the passages 100, which in turn communicate with each of the channels 58 of the filtrate chambers 48 through the ports 114 to admit air under pressure to the filtrate chambers 48, for a purpose hereinafter described.

Referring to FIGURES 3, 4 and 6, the bottom frame members 24 and 42 of the respective slurry frames 18 and filtrate frames 20 are provided with passages 116 and 118 forming manifolds 120, similar in all respects with the passages 88 and 90, and the manifolds 92 previously described. The manifolds 120 communicate with the bottom of the slurry chambers 30 through passages 122 and ports 124 in the same manner as the manifolds 92 communicate with the top of the slurry chambers 30 through passages 94 and ports 98, as previously described.

Referring to FIGURES 6 and 7, the lower portion of the end closure 16 is provided with passages 126 and 128 providing communication between the manifolds 120 and the cake and slurry discharge pipe 130, in the same manner as the passages 82 and 86 provide communication between manifolds 92 and slurry feed pipe 84, as previously described.

Referring to FIGURES 2, 3 and 4, the bottom frame members 24 and 42 of the respective slurry frames 18 and filtrate frames 20 are also provided with passages 131 and 132 forming a filtrate manifold 134, similar in all respects with the passages 104 and 106, and the manifold 108 previously described. The manifold 134 communicates with the bottom of the filtrate chambers 48 through passages 136 and ports 138 in the same manner as the manifold 108 communicates with the top of the filtrate chambers 48 through passages 100 and ports 114, as previously described.

Referring to FIGURES 2 and 7, the lower portion of the end closure 16 is provided with a passage 140 which connects the filtrate manifold 134 with the filtrate discharge pipe 142.

The operation of the filter apparatus for carrying out our method of filtration will now be described with particular reference to FIGURES 1 and 8.

Referring now to FIGURE 1, showing the piping arrangement for the filter receptacle 10, the previously mentioned slurry feed line 84, made up of a plurality of connected pipe sections, communicates with the bottom of the slurry tank 144. Slurry is delivered to the tank 144 from a source of supply through pipe line 146, in which is interposed a manually operated valve 148 maintained in open position during filtering operations. A manually operated valve 150 in slurry feed line 84 adjacent the tank 144 is also maintained in open position during filtering operations. A manually operated valve 152 in a drain line 154 connected to the slurry feed line 84 is maintained in closed position during filtering operations. Slurry is delivered under pressure to the slurry chambers 30 of the filter receptacle 10 by a pump 156 in the slurry feed line 84, the pump 156 being operated by motor M. Interposed in the slurry feed line 84 between the pump 156 and the filter receptacle 10 is a solenoid operated slurry feed valve V-1.

A slurry branch line 158 communicates with the slurry feed line 84 at a point between the pump 156 and valve V-1 and leads back to the top of the slurry tank 144. In branch line 158 is interposed a manually operated flow control valve 160, and also interposed therein between valve 160 and slurry feed line 84 is a solenoid operated valve V-3. Thus, with pump 156 in operation and valves V-1 and V-3 open, flow control valve 160 can be manually adjusted to establish a desired minimum filtering pressure below the pump pressure. A pressure gauge 162 connected to slurry pipe line 84 in proximity to the filter receptacle 10 is provided for indicating the pressure.

Interposed in the cake and slurry discharge line 130 there is interposed a solenoid operated valve V-5 and in the filtrate discharge line 142 there is interposed a solenoid operated valve V-4. In the air supply line 110 there is interposed a solenoid operated valve V-6. A branch air bleed line 164 connects with the air supply line 110 between the valve V-6 and the filter receptacle 10 and leads to the top of the slurry tank 144. Interposed in the air bleed line 164 is a solenoid operated valve V-2.

*Operation*

The operation of the filtering system as controlled by the sequential operation of the solenoid operated valves may be best understood and will be described with particular reference to FIGURES 1 and 8. In FIGURE 8, the vertical lines A and B represent the beginning and end respectively, of one cycle of operation, and the horizontal distance therebetween represents the unit of time for the completion of a cycle of operation. The cycle is repeated throughout the operation of the filter apparatus.

The vertical line C divides the time cycle AB into a filter time phase AC and a cake discharge time phase CB. At the start, manually operated valve 148 is opened to admit slurry to slurry tank 144, manually operated valve 150 is opened to admit slurry to slurry feed line 84 and pump 156, and of course drain valve 152 is closed. These valves need not be further manipulated during the operation of the filter system and no further mention of them is made in the following description. Manually operated valve 160 may be open or closed at this time.

Figure 8:
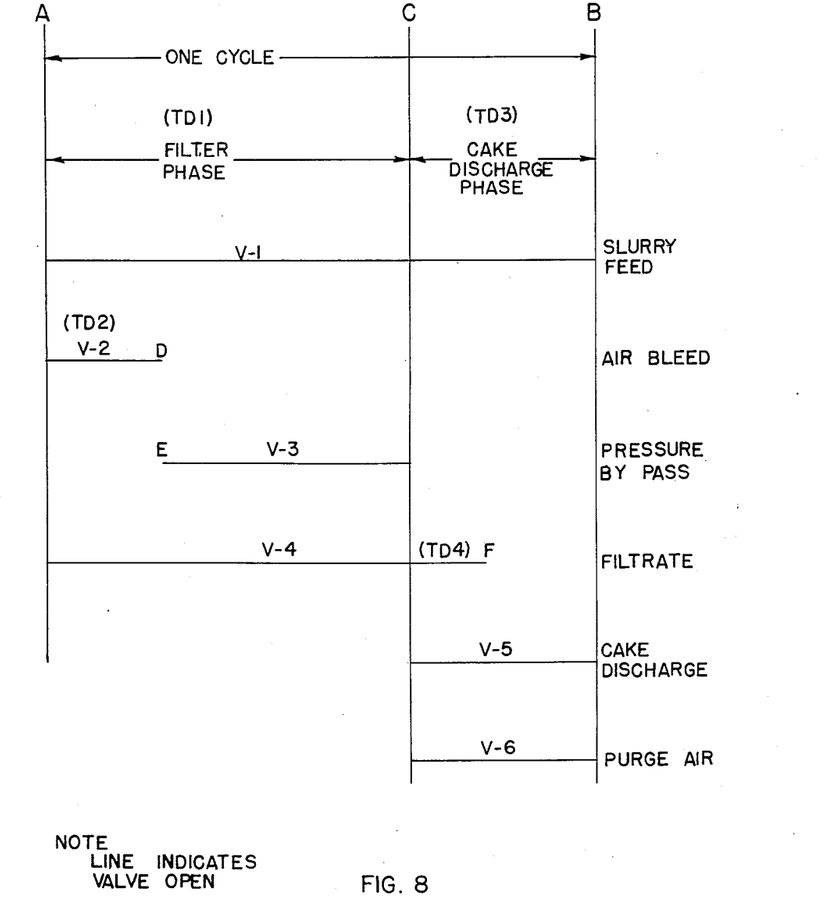
FIGURE 8 is a diagrammatic representation showing the relative conditions of the valves in the lines leading to the filter, during one cycle of operation.

In FIGURE 8 the horizontal lines V-1, V-2, V-3, V-4, V-5 and V-6 indicate the open position of the corresponding solenoid operated valves during each cycle of operation. Valve V-1 is shown as a solenoid operated valve and is arranged to be opened by the electrical control system, hereinafter described in detail, at the beginning of the operation of the device. This valve remains open throughout each cycle of operation until the electrical control system is shut down. The valve V-1 could very conveniently, therefore, be a manually operated valve if desired.

In any event valve V-1 remains open throughout each cycle of operation so that slurry is continuously delivered under pressure through slurry feed line 84 by pump 156 to the slurry chambers 30 of the filter receptacle 10. At the start of each cycle, solenoid operated valve V-2 is opened, so that the air in slurry feed line 84 and the slurry chambers 30 can bleed through air line 110 and branch bleed line 164 to the slurry tank 144, it being understood, as shown in FIGURE 8, that solenoid operated valve V-6 in air pressure supply line 110 is closed at this time. Also at the start of each cycle, solenoid operated valve V-4 in filtrate discharge line 142 is opened, whereupon filtrate from the filtrate chambers 48 flows through filtrate discharge line 142.

After a short interval of time, representing a fraction of the cycle AB sufficient to permit bleeding of the air from the system, as described above, the valve V-2 is arranged to close, the point at which valve V-2 closes being denoted in FIGURE 8 by D. At the same time that bleed valve V-2 closes, the solenoid operated valve V-3 in the slurry branch line 158 opens, as indicated at E in FIGURE 8. The flow regulating valve 160 is now manually adjusted, as hereinabove described, to establish a desired minimum filtering pressure below full pump pressure. Valve V-3 can be opened at A in the cycle rather that at E, but it is preferred to open valve V-3 at E in order to provide full pump pressure to effect bleeding of air from the system at the beginning of a cycle, thereby reducing the air bleed time to a minimum.

Filtration proceeds until the point C in the time cycle is reached, the filter phase AC representing the optimum filtering time, after which efficiency sharply diminishes. This optimum filtering time will vary with different slurries and may be determined by preliminary tests.

At the end C of the filter phase, the solenoid operated purge air valve V-6 in the air pressure supply line 110 and the solenoid operated valve V-5 in the slurry and cake discharge line 130 are opened, whereby air under pressure is, through the previously described passages and manifolds, introduced into the filtrate chambers 48 at a pressure higher than that obtaining in the slurry chambers 30. The air blowing through the filter cloths 34 removes the deposited cake therefrom causing it to be mixed with the slurry flowing through the slurry chambers 30, and the mixture of slurry and cake is discharged through line 130. With the opening of valves V–5 and V–6 it is preferred, though not necessary, to re-close solenoid operated valve V–3, so that full pump pressure is utilized to flush the cake from the slurry chambers 30, thereby minimizing the time required for the cake discharge phase CB of the cycle.

The solenoid operated valve V–4 in the filtrate discharge line 142, which as previously explained is open during the filter phase AC, is permitted to remain open for a short time after the end of the filter phase, as represented by the point F in FIGURE 8, in order to complete drainage of filtrate from the filtrate chambers 48. When the mixture of slurry and cake has been discharged from the slurry chambers 30, represented in FIGURE 8 by B, the cycle is complete, whereupon valves V–5 and V–6 re-close and valves V–2 and V–4 re-open. The cycle, as above described, is then repeated.

Electrical controls

Figure 9:
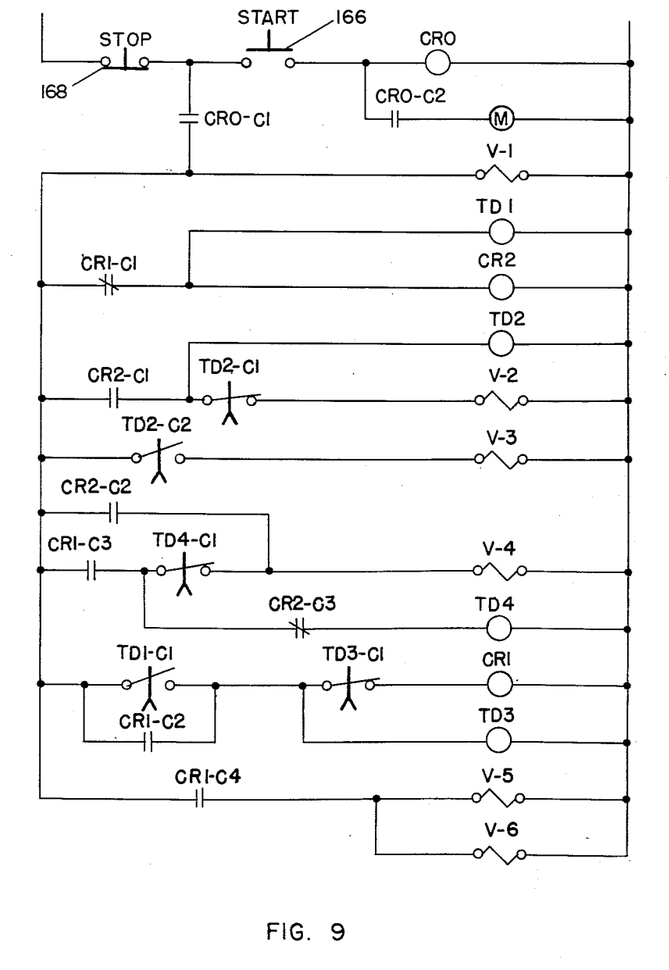
FIGURE 9 is a schematic wiring diagram of the electrical controls for the operation of the filter.

In FIGURE 9, there is diagramatically illustrated, a preferred electrical control system for the automatic operation of the filter apparatus, to which reference will now be made.

Upon pressing start push button 166, a circuit is completed to energize control relay CR0. Energization of control relay CR0 closes its normally open contact CR0—C1 to provide a holding circuit to retain CR0 energized upon release of start push button 166, and contact CR0—C1 remains closed until the circuit to control relay CR0 is broken by pressing stop push button 168. Energization of control relay CR0 closes a second contact CR0—C2, completing a circuit to motor M for operating the pump 156.

At the same time, a circuit is completed to (1) solenoid operated valve V–1 to open the same, as at line A in FIGURE 8; (2) a circuit is completed for energizing a time delay relay TD1; and (3) a circuit is completed to control relay CR2. Energization of control relay CR2, (1), closes its contact CR2—C1, thereby energizing a time delay relay TD2 and energizing solenoid operated air bleed valve V–2 to open the same as at line A in FIGURE 8; (2) closes its contact CR2—C2, thereby energizing solenoid operated filtrate discharge valve V–4 to open the same, as at line A in FIGURE 8; and (3) opens its contacts CR2—C3 in a circuit with time delay relay TD4.

With the occurrence of the above events, the filtering phase of the cycle of operation begins, as represented by line A in FIGURE 8.

When time delay relay TD2 times out, its contact TD2—C1 opens and its contact TR2—C2 closes whereupon solenoid operated air bleed valve V–2 re-closes and solenoid operated slurry by-pass valve V–3 opens. As previously explained, the valve V–2 closes and the valve V–3 opens a short time after the beginning of the cycle of operation, as represented by points D and E in FIGURE 8, so that time delay relay TD2 is arranged to time out at the desired time.

Time delay relay TD1 is arranged to time out at the end of the preselected filter phase, represented in FIGURE 8 by line C. When time delay relay TD1 times out, its contact TD1—C1 closes to complete a circuit and energize control relay CR1. Energization of control relay CR1 opens normally closed contact CR1—C1, which de-energizes time delay relay TD1 and control relay CR2. De-energization of time delay relay TD1 causes its contact TD1—C1 to re-open, but control relay CR1 remains energized because upon energization of control relay CR1, its hold contact CR1—C2 closed. At the same time that control relay CR1 is energized, a time delay relay TD3 is also energized. De-energization of control relay CR2, referred to above, effects re-opening of its contact CR2—C1, whereupon time delay relay TD2 causes its normally open contact TD2—C2 to reopen, thereby de-energizing solenoid operated slurry by-pass valve V–3 to re-close the same. De-energization of TD2, also causes its normally closed contact TD2—C1 to reclose, but since CR2—C1 is open, the air bleed valve V–2 remains closed.

De-energization of control relay CR2 effects re-opening of contact CR2—C2, but solenoid operated filtrate valve V–4 remains open since energization of control relay CR1 has effected closing of contact CR1—C3. De-energization of control relay CR2 also effects re-closing of normally closed contact CR2—C3 to energize time delay relay TD4.

The above referred to energization of control relay CR1, also closes a contact CR1—C4 thereby energizing solenoid operated slurry and cake discharge valve V–5 and solenoid operated purge air valve V–6, whereupon valves V–5 and V–6 are opened. As previously explained, this occurs at C (FIG. 8), i.e., at the end of the filter phase and the beginning of the slurry and cake discharge phase.

When time delay relay TD4 times out, which as previously explained is arranged to occur during the slurry and cake discharge phase, and shown at point F in FIGURE 8, it effects opening of its contact TD4—C1, thereby breaking the circuit to solenoid operated filtrate valve V–4 to close the valve V–4.

When time delay relay TD3 times out, which marks the end B, FIG. 8, of the cycle, it effects opening of its contact TD3—C1, thereby de-energizing time delay relay TD3 and also de-energizing control relay CR1. De-energization of control relay CR1 causes its contact CR1—C1 to re-close and its contact CR1—C2 to re-open. The re-opening of the contact CR1—C2 prevents re-energization of control relay CR1 and time delay relay TD3 upon re-closing of normally closed contact TD3—C1. Also upon de-energization of control relay CR1, its normally open contact CR1—C3 re-opens, which de-energizes time delay relay TD4 permitting normally closed contact TD4—C1 to re-close. Also upon de-energization of control relay CR1, its normally open contact CR1—C4 re-opens to effect de-energization of solenoid operated slurry and cake discharge valve V–5 and purge air valve V–6, whereupon these valves will re-close.

This completes the cycle of operation and the electrical system is in condition to automatically repeat the cycle.

In the electrical control system, as above described, the length of time permitted for the filtering phase is determined by the time delay relay TD1. The optimum time, as previously explained, being arrived at by preliminary tests of the slurry to determine the time when the efficiency of the filter medium sharply drops off or becomes clogged. It is apparent, however, that instead of a time delay means, a pressure differential actuating means may be employed to control the time of the filtering phase. In other words, as cake builds up on the filter medium, the pressure differential on opposite sides of the filter medium will increase, so that upon a preselected pressure differential, the pressure differential actuating means functions to effect the same results as the time delay relay TD1.

From the foregoing description of our invention, it will be apparent that it is subject to alteration and modification without departing from the spirit and scope thereof. Having now fully illustrated and described our invention we claim:

1. A filter device comprising a pair of longitudinally spaced end plates, a plurality of transverse vertical rectangular hollow frames clamped between said end plates to define a rectangular filter compartment, a filter medium between each of said hollow frames dividing said compartment into a plurality of alternate slurry and filtrate chambers, a slurry receiving manifold formed in and extending longitudinally through all of said frames, a slurry and cake discharge manifold formed in and extending longitudinally through all of said frames, said slurry receiving and discharge manifolds being disposed in said frames at opposed sides of the filter compartment defined by said frames, means in one series of alternate frames providing communication through said slurry chambers between said slurry receiving manifold and said slurry and cake discharge manifold, a fluid pressure receiving manifold formed in and extending longitudinally through all of said frames, a filtrate discharge manifold formed in and extending longitudinally through all of said frames, said fluid pressure receiving and filtrate discharge manifolds being disposed in said frames at opposed sides of the filter compartment defined by said frames, means in each frame of the other series of alternate frames providing communication between said fluid pressure receiving manifold and each of said filtrate chambers, and means in each frame of said other series of alternate frames providing communication between said filtrate discharge manifold and each of said filtrate chambers.

2. A filter device comprising a pair of longitudinally spaced end plates, a plurality of rectangular hollow frames between said end plates forming therewith an enclosed compartment, a filter medium between each of said hollow frames dividing said compartment into a plurality of alternate slurry and filtrate chambers, a first series of communicating passages extending longitudinally through the top frame member of each of said frames to form a common slurry receiving manifold, a second series of communicating passages extending longitudinally through the bottom frame member of each of said frames to form a common slurry discharge manifold, means in said top and bottom frame members of one series of alternate frames respectively providing communication between said slurry receiving and slurry discharge manifolds through said slurry chambers, a third series of communicating passages extending longitudinally through the top frame member of each of said frames to form a common fluid pressure receiving manifold, means for delivering air under pressure to said third common manifold, a fourth series of communicating passages extending longitudinally through the bottom frame member of each of said frames to form a common filtrate discharge manifold, filtrate discharge means leading from said fourth common manifold, means in each frame of the other series of alternate frames providing communication between said fluid pressure receiving manifold and each of said filtrate chambers, and means in each frame of said other series of alternate frames providing communication between said filtrate discharge manifold and each of said filtrate chambers.

3. A filter device having an unfiltered liquid chamber and a filtered liquid chamber and a material retaining filter medium therebetween, means for continuously delivering unfiltered liquid to said unfiltered liquid chamber; a drain connected to said unfiltered liquid chamber; a drain connected to said filtered liquid chamber; a pressurized air supply line connected to said filtered liquid chamber separate and apart from said last named drain; a normally closed valve in said unfiltered liquid drain and a normally closed valve in said pressurized air supply line and a normally open valve in said filtered liquid drain whereby liquid is filtered in said device; and control means intermittently opening and closing the valves in said unfiltered liquid drain and said pressurized air supply line simultaneously and closing the valve in said filtered liquid drain subsequent to each opening but prior to each closing of the valves in said unfiltered liquid drain and said pressurized air supply line to admit pressurized air to said filtrate chamber to displace the filtrate in said filtered liquid chamber while said filtered liquid drain valve is open and to dislodge deposited material from said filter medium while said filtered liquid drain valve is closed; whereby the continuous supply of unfiltered liquid is alternately filtered and discharged along with the dislodged deposited material.

4. A filter device according to claim 3 wherein said valves are solenoid operated valves included in an electrical circuit, and timer means in said circuit for controlling said solenoid operated valves.

References Cited in the file of this patent

UNITED STATES PATENTS

| | | |
|---|---|---|
| 393,633 | Enzinger | Nov. 27, 1888 |
| 945,146 | Wilson | Jan. 4, 1910 |
| 996,537 | Sweetland | June 27, 1911 |
| 1,282,414 | Hagstrom | Oct. 22, 1918 |
| 1,488,862 | Burchenal | Apr. 1, 1924 |
| 2,183,075 | Hughes | Dec. 12, 1939 |
| 2,186,501 | Seligman et al. | Jan. 9, 1940 |
| 2,453,613 | Babbitt | Nov. 9, 1948 |
| 2,681,153 | Armbrust | June 15, 1954 |
| 2,772,786 | Gardes | Dec. 4, 1956 |